US012725081B2

(12) United States Patent
Hoffman et al.

(10) Patent No.: US 12,725,081 B2
(45) Date of Patent: Sep. 1, 2026

(54) CAUSAL LEARNING MODEL

(71) Applicant: International Business Machines Corporation, Armonk, NY (US)

(72) Inventors: Samuel Chung Hoffman, New York, NY (US); Kahini Wadhawan, Delhi (IN); Payel Das, Yorktown Heights, NY (US); Prasanna Sattigeri, Acton, MA (US); Karthikeyan Shanmugam, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 18/307,856

(22) Filed: Apr. 27, 2023

(65) Prior Publication Data

US 2024/0362530 A1 Oct. 31, 2024

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
USPC ........................................................... 706/12
See application file for complete search history.

(56) References Cited

U.S. PATENT DOCUMENTS 11,061,393 B2 7/2021 Abe et al.
11,415,975 B2 8/2022 Huang et al.
12,482,150 B2 * 11/2025 Ye .......................... G06T 12/20
2011/0202322 A1 * 8/2011 Statnikov ................. G06N 5/02 703/2
2019/0370610 A1 * 12/2019 Batoukov ........... G06F 11/0709
2020/0110982 A1 * 4/2020 Gou ....................... G06V 10/82
2020/0265304 A1 * 8/2020 Nagaraj Chandrashekar ............. G06N 3/0464
2020/0394512 A1 * 12/2020 Zhang .................... G06N 7/023
2021/0097402 A1 * 4/2021 Ohta ...................... G06N 3/088
2021/0104330 A1 4/2021 Neumann
2021/0358577 A1 * 11/2021 Zhang .................. G06N 3/0499
2022/0172050 A1 * 6/2022 Dalli .................... G06N 3/0495
2022/0222402 A1 * 7/2022 Okawachi ............ G06N 3/0455
2022/0400251 A1 * 12/2022 Fisher .................... G16H 50/20

(Continued)

FOREIGN PATENT DOCUMENTS

CN 108629418 A 10/2018
CN 111651983 B 6/2021

(Continued)

OTHER PUBLICATIONS

Besserve et al. "Counterfactuals uncover the modular structure of deep generative models." arXiv preprint arXiv:1812.03253 (Year: 2018) 26 pages.

(Continued)

*Primary Examiner* — Leron Beck
(74) *Attorney, Agent, or Firm* — CANTOR COLBURN LLP; Jordan Schiller

(57) ABSTRACT

Techniques are provided for causal learning and prediction. In one embodiment, the techniques involve determining a first attribute value based on an output of a generative model trained on a first data set, generating a second attribute value based on a change of a latent space dimension of the generative model, generating a sensitivity map based on a difference between the first attribute value and the second attribute value; and generating a causal graph based on the sensitivity map.

20 Claims, 5 Drawing Sheets

200
Generative model 202
Encoder 204
206
Decoder 210
Decoder Output 212
208
Sensitivity map 214
Causal Graph 216
Classifier 218

(56) References Cited

U.S. PATENT DOCUMENTS

| | | | | |
|---|---|---|---|---|
| 2023/0237725 | A1* | 7/2023 | Zoss | G06T 13/40 345/419 |
| 2023/0326099 | A1* | 10/2023 | Lee | G06T 12/30 382/131 |
| 2025/0174299 | A1* | 5/2025 | Clark | G16B 40/30 |
| 2025/0246262 | A1* | 7/2025 | Biancalani | G16B 20/30 |

FOREIGN PATENT DOCUMENTS

| | | | |
|---|---|---|---|
| CN | 109754158 | B | 8/2022 |
| CN | 113676360 | B | 10/2022 |
| CN | 115239033 | A | 10/2022 |
| EP | 3602966 | B1 | 8/2021 |

OTHER PUBLICATIONS

Chen et al., "Isolating sources of disentanglement in VAEs" Proceedings of the 32nd International Conference on Neural Information Processing Systems. vol. 2615. (Year: 2018) 29 pages.

D.M. Chickering "Optimal structure identification with greedy search," Journal of Machine Learning Research 3 (Year: 2002): pp. 507-554.

(Grace period disclosure under 35 U.S.C. 102(b)(1)(A)) Hoffman et al., "Casual Graphs Underlying Generative Models: Path to Learning with Limited Data," arXiv preprint arXiv:2207.07174 (Year:2022), published on Jul. 14, 2022: 15 pages.

Kocaoglu, Murat, et al. "Causalgan: Learning causal implicit generative models with adversarial training." arXiv preprint arXiv:1709.02023 (Year: 2017): pp. 1-37.

Kumar et al., "Variational inference of disentangled latent concepts from unlabeled observations." arXiv preprint arXiv:1711.00848 (Year: 2017): pp. 1-16.

Makhzani, Alireza, et al. "Adversarial autoencoders." arXiv preprint arXiv:1511.05644 (Year: 2015): 16 pages.

Shimizu, "LiNGAM: Non-Gaussian methods for estimating causal structures" Behaviormetrika, 41(1), 65-98, (Year 2014) pp. 1-48.

Spirtes et al., "Causation, Prediction, and Search" The MIT Press, Cambridge, Massachussets, (Year: 2000), 554 pages.

Wikipedia, "Markov blanket" https://en.wikipedia.org/wiki/Markov_blanket#/media (Retrieved Feb. 6, 2023), 1 page.

Yang et al., "Causalvae: Disentangled representation learning via neural structural causal models," Proceedings of the IEEE/CVF conference on computer vision and pattern recognition. (Year: 2021): pp. 9593-9602.

Hoffman et al., "Attribute Graphs Underlying Molecular Generative Models: Path to Learning with Limited Data", arXiv:2207.07174v2 [cs.LG], Aug. 29, 2024, 19 pages.

Kim et al., "Counterfactual Fairness with Disentangled Causal Effect Variational Autoencoder", arXiv:2011.11878v2 [cs.LG], Dec. 9, 2020, 9 pages.

Anonymous, "Causal Discovery Example", https://www.pywhy.org/dowhy/main/example_notebooks/dowhy_causal_discovery_example.html, Retrieved: Dec. 29, 2025, 38 pages.

* cited by examiner

200

300

500

CAUSAL LEARNING MODEL

STATEMENT REGARDING PRIOR DISCLOSURES BY THE INVENTOR OR A JOINT INVENTOR

The following disclosure is submitted under 35 U.S.C. 102(b)(1)(A): DISCLOSURE: "Causal Graphs Underlying Generative Models: Path to Learning with Limited Data," Samuel C. Hoffman, Kahini Wadhawan, Payel Das, Prasanna Sattigeri, Karthikeyan Shanmugam, pages 1-15, published at arXiv.org on Jul. 14, 2022, available at https://arxiv.org/abs/2207.07174.

BACKGROUND

The present invention relates to causal models, and more specifically, to learning and modeling causal relationships from machine learning models.

Traditional deep learning systems make statistical correlations between data points in training data to form a model that classifies input data. However, spurious data points in the training data can lead to biases in the model, and reduce the accuracy of the model when applied to data sets not used to train the model.

SUMMARY

A method is provided according to one embodiment of the present disclosure. The method includes determining a first attribute value based on an output of a generative model trained on a first data set; generating a second attribute value based on a change of a latent space dimension of the generative model; generating a sensitivity map based on a difference between the first attribute value and the second attribute value; and generating a causal graph based on the sensitivity map. Advantageously, this enables the use of learned causal relationships to increase the accuracy of identifications and predictions of data points in external data sets.

According to another embodiment of the present disclosure, the method further includes identifying, based on the causal graph, a node corresponding to an attribute of interest; generating a classifier of the node corresponding to the attribute of interest; and predicting the attribute of interest in a second data set based on the classifier. Advantageously, this enables tailored uses of causal relationships for robust identifications and predictions of the attributes in external data sets with limited data.

According to another embodiment of the present disclosure, the second attribute value is generated by sampling the latent space dimension across a range of values. Advantageously, this enables broad discovery and learning of causal relationships of the generative model, which increases the robustness of learned causal relationships of the generative model.

According to another embodiment of the present disclosure, the sensitivity map comprises a weight matrix of weights generated based on a linear regression analysis of the difference between the first attribute value and the second attribute value with respect to multiple latent space dimensions of the generative model. Advantageously, this enables differentiation between causal relationships versus correlations and patterns of the generative model, which increases the accuracy of learned causal relationships of the generative model.

According to another embodiment of the present disclosure, the causal graph is a probabilistic graphical model that depicts causal relationships between multiple attributes of the first data, a node of the causal graph comprises one of the multiple attributes, and an edge of the causal graph represents a causal relationship between two nodes. Advantageously, this enables generation of a causal graph in a structural causal model format, which allows for structured causal analysis. Further, this enables the use of classifiers, which enables the identification and prediction of individual attributes in an external data set.

According to another embodiment of the present disclosure, the classifier comprises a set of nodes of the causal graph that share a causal relationship with the node corresponding to the attribute of interest, and the classifier is generated via a Markov boundary applied to the node corresponding to the attribute of interest. Advantageously, this enables the use of tailored classifiers, which allow for the identification and prediction of individual attributes in external data sets.

According to another embodiment of the present disclosure, the attribute of interest is predicted by mapping nodes of the classifier to corresponding attributes in the second data set, and the first data set is different from the second data set. Advantageously, this enables the identification and prediction of individual attributes in external data sets.

A system is provided according to one embodiment of the present disclosure. The system includes a processor; and memory or storage comprising an algorithm or computer instructions, which when executed by the processor, performs an operation that includes: determining a first attribute value based on an output of a generative model trained on a first data set; generating a second attribute value based on a change of a latent space dimension of the generative model; generating a sensitivity map based on a difference between the first attribute value and the second attribute value; and generating a causal graph based on the sensitivity map. Advantageously, this enables the use of learned causal relationships to increase the accuracy of identifications and predictions of data points in external data sets.

According to another embodiment of the present disclosure, the operation further includes identifying, based on the causal graph, a node corresponding to an attribute of interest; generating a classifier of the node corresponding to the attribute of interest; and predicting the attribute of interest in a second data set based on the classifier. Advantageously, this enables tailored uses of causal relationships for robust identifications and predictions of the attributes in external data sets with limited data.

According to another embodiment of the present disclosure, the second attribute value is generated by sampling the latent space dimension across a range of values. Advantageously, this enables broad discovery and learning of causal relationships of the generative model, which increases the robustness of learned causal relationships of the generative model.

According to another embodiment of the present disclosure, the sensitivity map comprises a weight matrix of weights generated based on a linear regression analysis of the difference between the first attribute value and the second attribute value with respect to multiple latent space dimensions of the generative model. Advantageously, this enables differentiation between causal relationships versus correlations and patterns of the generative model, which increases the accuracy of learned causal relationships of the generative model.

According to another embodiment of the present disclosure, the causal graph is a probabilistic graphical model that depicts causal relationships between multiple attributes of the first data, a node of the causal graph comprises one of the multiple attributes, and an edge of the causal graph represents a causal relationship between two nodes. Advantageously, this enables generation of a causal graph in a structural causal model format, which allows for structured causal analysis. Further, this enables the use of classifiers, which enables the identification and prediction of individual attributes in an external data set.

According to another embodiment of the present disclosure, the classifier comprises a set of nodes of the causal graph that share a causal relationship with the node corresponding to the attribute of interest, and the classifier is generated via a Markov boundary applied to the node corresponding to the attribute of interest. Advantageously, this enables the use of tailored classifiers, which allow for the identification and prediction of individual attributes in external data sets.

According to another embodiment of the present disclosure, the attribute of interest is predicted by mapping nodes of the classifier to corresponding attributes in the second data set, and the first data set is different from the second data set. Advantageously, this enables the identification and prediction of individual attributes in external data sets.

A computer-readable storage medium having computer-readable program code embodied therewith, the computer-readable program code executable by one or more computer processors to perform an operation, is provided according to one embodiment of the present disclosure. The operation includes determining a first attribute value based on an output of a generative model trained on a first data set; generating a second attribute value based on a change of a latent space dimension of the generative model; generating a sensitivity map based on a difference between the first attribute value and the second attribute value; and generating a causal graph based on the sensitivity map. Advantageously, this enables the use of learned causal relationships to increase the accuracy of identifications and predictions of data points in external data sets.

According to another embodiment of the present disclosure, the operation further includes identifying, based on the causal graph, a node corresponding to an attribute of interest; generating a classifier of the node corresponding to the attribute of interest; and predicting the attribute of interest in a second data set based on the classifier. Advantageously, this enables tailored uses of causal relationships for robust identifications and predictions of the attributes in external data sets with limited data.

According to another embodiment of the present disclosure, the second attribute value is generated by sampling the latent space dimension across a range of values. Advantageously, this enables broad discovery and learning of causal relationships of the generative model, which increases the robustness of learned causal relationships of the generative model.

According to another embodiment of the present disclosure, the sensitivity map comprises a weight matrix of weights generated based on a linear regression analysis of the difference between the first attribute value and the second attribute value with respect to multiple latent space dimensions of the generative model. Advantageously, this enables differentiation between causal relationships versus correlations and patterns of the generative model, which increases the accuracy of learned causal relationships of the generative model.

According to another embodiment of the present disclosure, the causal graph is a probabilistic graphical model that depicts causal relationships between multiple attributes of the first data, a node of the causal graph comprises one of the multiple attributes, and an edge of the causal graph represents a causal relationship between two nodes. Advantageously, this enables generation of a causal graph in a structural causal model format, which allows for structured causal analysis. Further, this enables the use of classifiers, which enables the identification and prediction of individual attributes in an external data set.

According to another embodiment of the present disclosure, the classifier comprises a set of nodes of the causal graph that share a causal relationship with the node corresponding to the attribute of interest, and the classifier is generated via a Markov boundary applied to the node corresponding to the attribute of interest. Advantageously, this enables use of tailored classifiers, which allow for the identification and prediction of individual attributes in external data sets.

DETAILED DESCRIPTION

Figure 1:
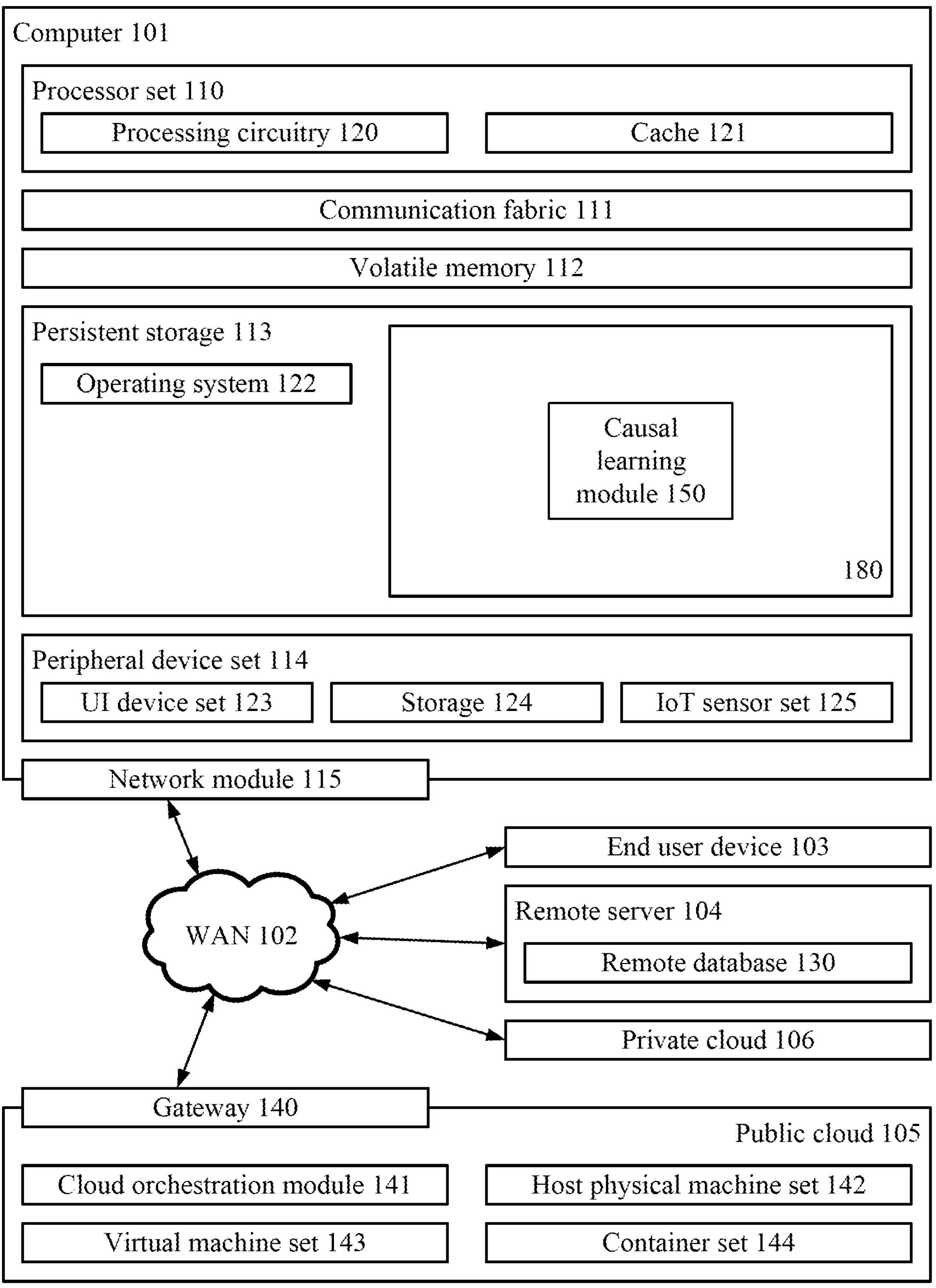
FIG. 1 illustrates a computing environment, according to one embodiment.

Embodiments of the present disclosure determine causal relationships between attributes of the machine learning models. In one embodiment, a causal learning module generates a causal graph from a pre-trained generative model by perturbing dimensions of a latent space representation of the generative model, and learning causal relationships from the resulting generative model outputs. Further, the causal learning module can generate a classifier for an attribute or node of the causal graph, which can be used to identify and predict outcomes in external data.

One benefit of embodiments of the present disclosure is to enable the use of learned causal relationships to increase the accuracy of identifications and predictions of data points in external data sets (i.e., data sets of unfamiliar domains, or data sets not used to train a machine learning model from which the causal relationships were learned). Further, embodiments of the present disclosure can reduce biases in machine learning models by using the causal relationships to correct misleading correlative relationships of the models, and to minimize the impact of spurious data points in the training data.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to one embodiment. Computing environment 100 contains an example of an environment for the execution of at least some of the computer code involved in performing the inventive methods, such as new causal learning module 150 shown in block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
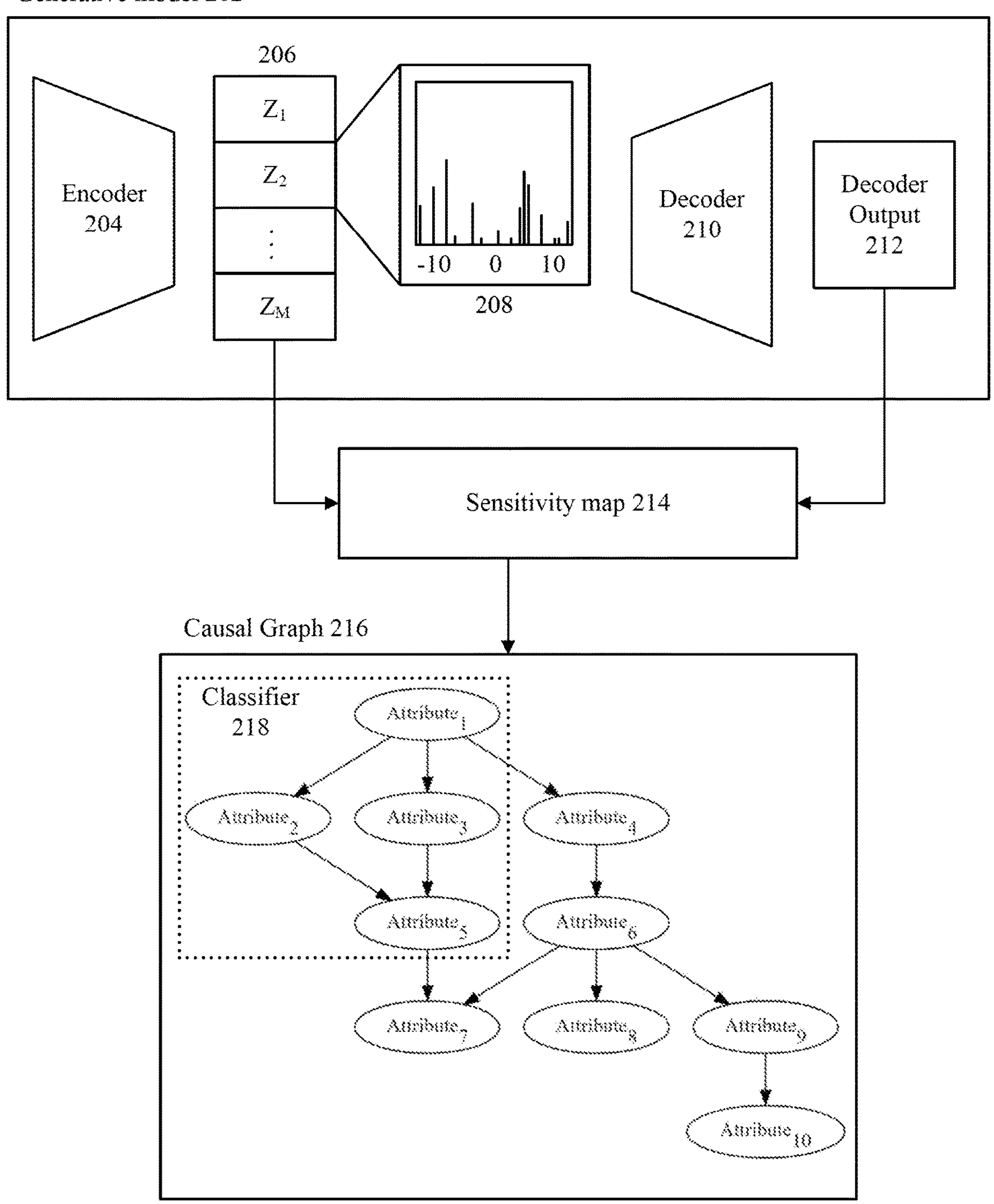
FIG. 2 illustrates a causal learning environment, according to one embodiment.

FIG. 2 illustrates a causal learning environment 200, according to one embodiment. The causal learning environment 200 represents one example of features that can be used by the causal learning module 150 to identify and predict attributes in data sets external to the causal learning environment 200. In one embodiment, the causal learning module 150 represents one or more algorithms, instruction sets, software applications, or other computer-readable program instructions residing in a memory or storage, and can be executed by the processor set 110 to perform the functions, operations, or processes described herein.

In the illustrated embodiment, the causal learning environment 200 includes a generative model 202, a sensitivity map 214, and a causal graph 216. In one embodiment, the generative model 202 is a pre-trained machine learning model that uses an input, and patterns and correlations learned from training data, to generate new data that resembles the training data. Generally, the generative model 202 includes continuous (non-discrete) latent space representations. Further, embodiments of the present disclosure can use a generative model 202 without a disentangled latent space.

One benefit of embodiments of the present disclosure is that causal relationships can be learned from a post-hoc analysis of the pre-trained machine learning model, which prevents influencing or interfering with the training of the generative model 202.

Examples of the generative model 202 include variational autoencoders (VAEs), generative adversarial networks, and the like. In the illustrated embodiment, the generative model 202 is a VAE that includes an encoder 204, a latent space vector 206, a decoder 210, and a decoder output 212. The encoder 204 encodes or maps an input (not shown) to latent space representations expressed as latent space vector 206. In one embodiment, a "latent space representation" is a probability distribution of the encoded input (often, of a lower-dimensional representation of the input). Hence, dimensions $Z_{1-M}$ of the latent space vector 206 reflect features of the input across the probability distribution. The decoder 210 generates decoder output 212 by using the dimensions $Z_{1-M}$ to generate new data points that resemble the input to the encoder 204.

The sensitivity map 214 can be derived from the generative model 202. In one embodiment, the sensitivity map 214 is a weight matrix that captures changes of the decoder output 212 due to changes in the dimensions $Z_{1-M}$ of the latent space vector 206 over a sampling range 208. In this manner, the sensitivity map 214 can capture information that reflects causal relationships between attributes of the generative model 202. The sensitivity map 214 is described in further detail in FIGS. 3-4 below.

Information from the sensitivity map 214 can be used to generate the causal graph 216. In one embodiment, the causal graph 216 is a probabilistic graphical model that depicts causal relationships between attributes of the training data of the generative model 202. Hence, the attributes, represented as nodes of the causal graph, can reflect features of any domain or content of the training data. In the illustrated embodiment, the causal graph 216 is portrayed as a directed acyclic graph (DAG) in a structural causal model, where the nodes represent the attributes, and the directed edges represent causal relationships between the attributes. The causal graph is described in further detail in FIGS. 3-4 below.

Further, the causal graph 216 can be used to generate a classifier 218 of an attribute. In one embodiment, the classifier 218 is a set of attributes of the causal graph 216 that share a causal relationship with a given attribute, and can be used to identify or predict the given attribute in external data sets. The classifier 218 is described in further detail in FIG. 5 below.

One benefit of embodiments of the present disclosure is to enable the use of tailored classifiers, which allow for the identification and prediction of individual attributes in external data sets. Further, embodiments of the present disclosure leverage causal relationships instead of correlations and patterns, which allows for robust identifications and predictions of the attributes in the external data sets with limited data.

Figure 3:
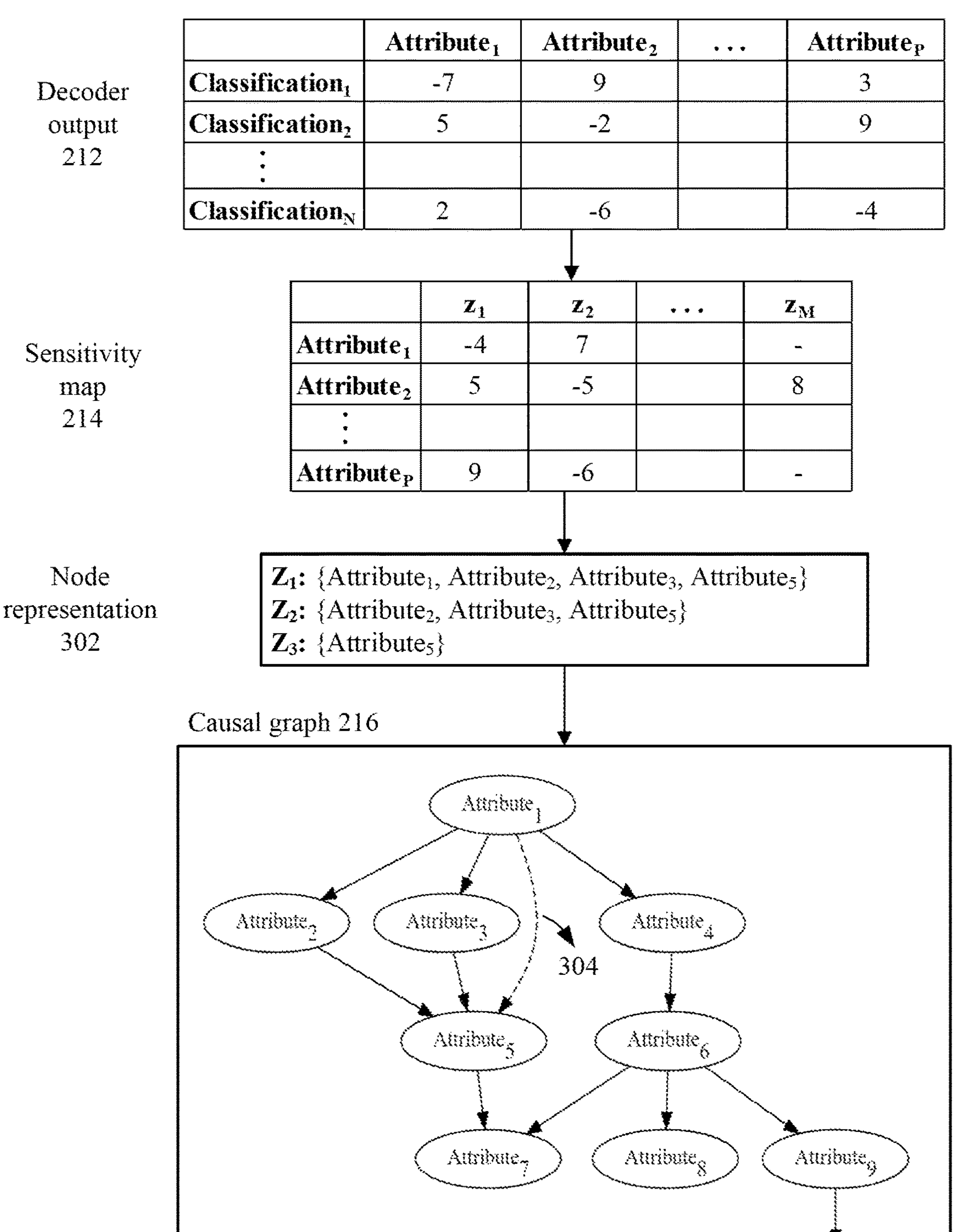
FIG. 3 illustrates a causal graph generation environment, according to one embodiment.
Figure 4:
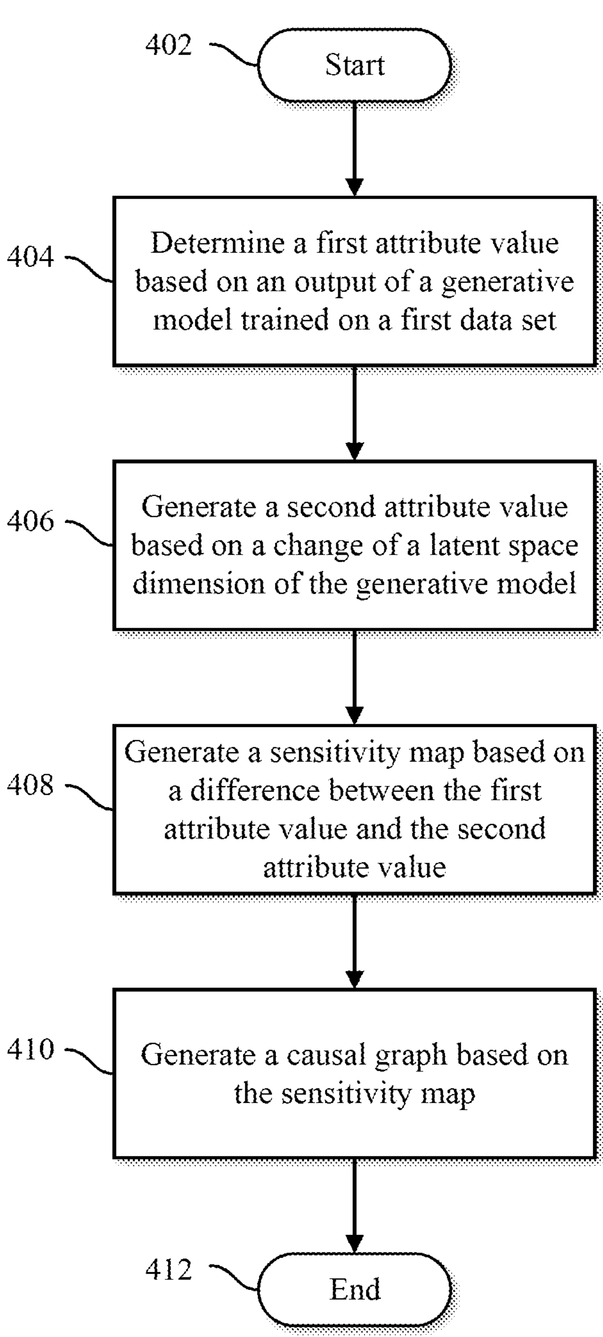
FIG. 4 illustrates a flowchart of a method of generating a causal graph, according to one embodiment.

FIG. 3 illustrates a causal graph generation environment 300, according to one embodiment. FIG. 4 illustrates a flowchart of a method 400 of generating a causal graph, according to one embodiment. FIG. 3 is explained in conjunction with FIG. 4.

As described above, attributes of the causal graph can reflect features of any domain or content of the training data. As a non-limiting example, the generative model 202 may be pre-trained on training data that includes data concerning peptides. Assuming the input to the generative model 202 is a peptide sequence, the encoder 204 can map features of the peptide sequence to the multiple dimensions $Z_{1-M}$ of the latent space vector 206. Afterwards, the decoder 210 attempts to reconstruct the input peptide sequence by mapping the latent space vector 206 to classifications$_{1-N}$ of the decoder output 212. In the embodiment illustrated in FIG. 3, the classifications$_{1-N}$ represents output peptide sequences.

The method 400 begins at block 402. At block 404, the causal learning module 150 determines a first attribute value based on an output of a generative model 202 trained on a first data set. In one embodiment, the first data set includes the training data of the generative model 202. In the embodiment illustrated in FIG. 3, attribute values correspond to attributes$_{1-P}$ of the classifications$_{1-N}$ of the decoder output 212. Continuing the previous example, the attributes$_{1-P}$ of a given output peptide sequence can include antimicrobial strength, aromaticity, charge, length, molecular weight, number of included amino-acids, presence of antimicrobial properties, solubility, toxicity, or the like.

In one embodiment, the causal learning module 150 observes, calculates, measures, or otherwise determines the attribute values of the attributes$_{1-P}$ from the classifications$_{1-N}$ of the decoder output 212. For instance, the causal learning module 150 can model an output peptide sequence from which the attributes values are determined, or the causal learning module 150 can invoke machine learning models trained to determine the attribute values.

At block 406, the causal learning module 150 generates a second attribute value based on a change of a latent space dimension of the generative model 202. Continuing the above example, as previously discussed, the decoder 210 attempts to reconstruct the input peptide sequence by mapping the latent space vector 206 to classifications$_{1-N}$ of the decoder output 212. Hence, each change in a dimension $Z_{1-M}$ of the latent space vector 206 can cause changes to the classifications$_{1-N}$ and corresponding attribute values of the decoder output 212.

The causal learning module 150 can generate these changes in the decoder output 212 by applying a sampling range 208 to each dimension $Z_{1-M}$ of the latent space vector 206. In one embodiment, the sampling range 208 includes a range of values that reflect the range of latent variables encoded from the input to the generative model 202. Each time a value of a dimension $Z_{1-M}$ is changed, the causal learning module 150 can identify the resulting classifications$_{1-N}$ and attribute values of the decoder output 212 using a process similar to the process for determining the first attribute value described above. In one embodiment, the second attribute value includes one of the resultant attribute values.

At block 408, the causal learning module 150 generates a sensitivity map 214 based on a difference between the first attribute value and the second attribute value. The difference between the first and second attribute values can represent one measure of a relationship between changes to the latent space vector 206 and the attribute values. Hence, in the aggregate (i.e., after aggregating differences between the attributes values caused by perturbations to the dimension $Z_{1-M}$ of the latent space vector 206) differences between original and resultant attribute values can capture, along with many correlations and patterns, the underlying causal relationships of the generative model 202.

In one embodiment, the causal learning module 150 applies a linear regression to the differences in the attribute values to determine a weight between the attributes$_{1-P}$ for each corresponding dimension $Z_{1-M}$ of the latent space vector 206. For instance, the causal learning module 150 may apply a lasso regression, least squares regression, ridge regression, or the like, with the differences in the attribute values versus the changes to the dimensions $Z_{1-M}$.

The causal learning module 150 can then generate the sensitivity map 214 from the linear regression. In the embodiment illustrated in FIG. 3, the sensitivity map 214 is a weight matrix that captures changes of the attribute values of the decoder output 212 due to changes in the dimensions $Z_{1-M}$ of the latent space vector 206 over the sampling range 208.

In one embodiment, the causal learning module 150 filters the weights before or after entry into the weight matrix, such that the resultant sensitivity map excludes weights that do not meet a minimum threshold magnitude. For instance, the sensitivity map 214 shown in FIG. 3 may apply a filter to exclude weights with a magnitude less than 2. In this manner, the sensitivity map 214 can represent the strongest, or most influential, causal relationships between the attributes$_{1-P}$.

At block 410, the causal learning module 150 generates a causal graph based on the sensitivity map 214. As described above, in one embodiment, the causal graph 216 is a probabilistic graphical model that depicts causal relationships between attributes of the generative model 202. The causal graph 216 can be portrayed as a directed acyclic graph (DAG) in a structural causal model, where the nodes represent the attributes, and the directed edges represent causal relationships between the attributes.

In the embodiment illustrated in FIG. 3, one instance of the sensitivity map 214 is rewritten in a node representation 302 form, where a weight connecting one of the attributes$_{1-P}$ to a dimensions $Z_{1-M}$ of the latent space vector 206 (as indicated by the sensitivity map 214) indicates a node and edge associated with the attribute. Although, the causal learning module 150 can generate the causal graph 216 directly from the sensitivity map 214, the node representation 302 is used herein to aid in the explanation of the construction of the causal graph 216.

In one embodiment, the casual learning module 150 constructs nodes and edges of the causal graph 216 in order of the attributes$_{1-P}$ with the smallest amount of dimension $Z_{1-M}$ influences. As shown in the node representation 302, dimension $Z_3$ indicates a causal relationship with one attribute (attribute$_5$), dimension $Z_2$ indicates a causal relationship with three attributes (attributes$_{2-3}$ and attribute$_5$), and dimension $Z_1$ indicates a causal relationship with four attributes (attributes$_{1-3}$ and attribute$_5$). Hence, the order of construction of the causal graph 216 is dimension $Z_3$, then dimension $Z_2$, and then dimension $Z_1$.

For each dimension $Z_{1-M}$, in the order of construction, the causal learning module 150 can generate a node of the causal graph 216 for each attribute of the dimension of the node representation 302, generate edges between nodes of the causal graph 216 that reflect the relationship between the attributes$_{1-P}$ of the node representation 302, and remove the attribute that has a node in the causal graph 216 from the node representation 302. In one embodiment, the causal learning module 150 generates an edge in the causal graph 216 between each remaining attribute and each removed attribute of the dimension in the node representation 302. This process is repeated in the order of construction. In another embodiment, the causal learning module 150 also adds weights reflected in the sensitivity map 214 to the edges of the causal graph 216 to indicate the strength of the causal relationships between the attributes.

For instance, in the embodiment illustrated in FIG. 3, at dimension $Z_3$ of the node representation 302, the causal learning module 150 generates a node in the causal graph 216 for attribute$_5$. Because there are no other nodes in dimension $Z_3$, the causal learning module 150 does not generate an edge in the causal graph 216 for attribute$_5$. The causal learning module 150 then removes all instances of attribute$_5$ from the node representation 302.

At dimension $Z_2$ of the node representation 302, the causal learning module 150 generates nodes in the causal graph 216 for attributes$_{2-3}$. The causal learning module 150 also generates edges in the causal graph 216 between the remaining attributes (attributes$_{2-3}$) and the removed attribute (attribute$_5$) of the node representation 302. Hence, the causal learning module 150 generates an edge between attribute$_2$ and attribute$_5$, and an edge between attribute$_3$ and attribute$_5$. The causal learning module 150 then removes all instances of attributes$_{2-3}$ from the node representation 302.

At dimension $Z_1$ of the node representation 302, the causal learning module 150 generates a node in the causal graph 216 for attributes$_1$. The causal learning module 150 also generates edges in the causal graph 216 between the remaining attribute ($attributes_1$) and the removed attributes ($attributes_{2-3}$ and $attribute_5$) of the node representation 302. Hence, the causal learning module 150 generates an edge between $attribute_1$ and $attribute_2$, an edge between $attribute_1$ and $attribute_3$, and an edge between $attribute_1$ and $attribute_5$. The causal learning module 150 then removes all instances of $attributes_1$ from the node representation 302. This process repeats in the order of construction until all the $attributes_{1-P}$ and causal relationships of the node representation 302 are reflected as nodes and edges in the causal graph 216.

During, or after, construction of the causal graph 216, the causal learning module 150 can perform a transitive reduction process of the causal graph 216 to minimize the number of edges of the causal graph 216, while maintaining reachability. In the embodiment illustrated in FIG. 3, the causal learning module 150 performs the transitive reduction process by removing the edge 304 between $attribute_1$ and $attribute_5$, since $attribute_1$ can also reach attributes via the path between $attribute_1$, $attribute_2$, and $attribute_5$, or the path between $attribute_1$, $attribute_3$, and $attribute_5$. The method 400 ends at block 412.

Figure 5:
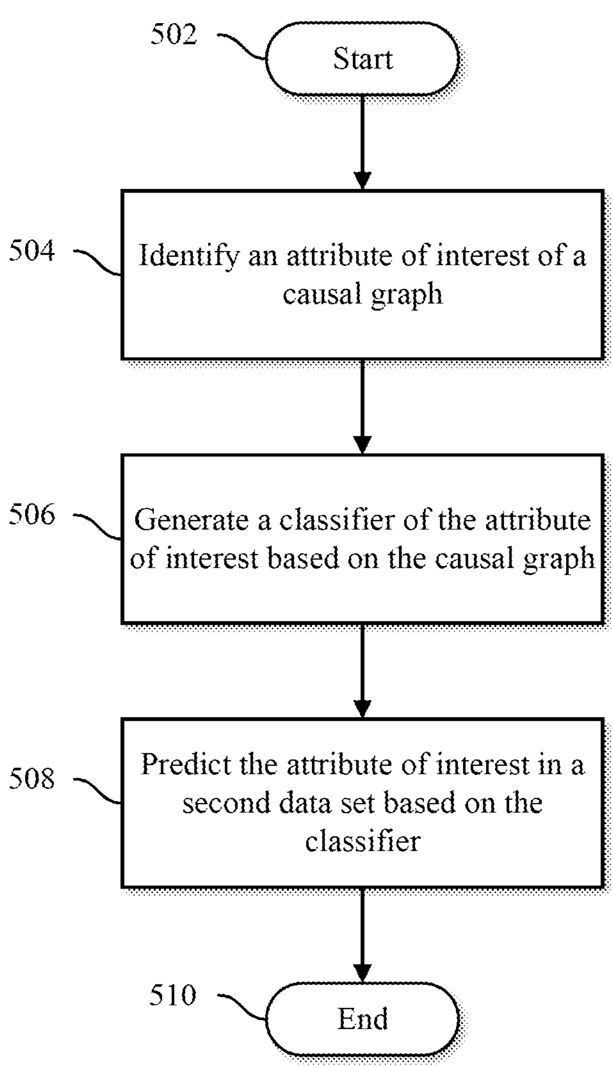
FIG. 5 illustrates a flowchart of a method of implementing a causal graph, according to one embodiment.

FIG. 5 illustrates a flowchart of a method 500 of implementing a causal graph 216, according to one embodiment. The method 500 represents one example by which the causal graph 216 can be used to identify or predict a given attribute in a new data set. The method 500 begins at block 502.

At block 504, the causal learning module 150 identifies an attribute of interest of a causal graph 216. Continuing the above example, assuming the causal graph 216 was generated using the attributes of the peptides, the causal graph 216 represents causal relationships between the attributes of the peptides. As previously discussed, the $attributes_{1-P}$ of a peptide sequence can include antimicrobial strength, aromaticity, charge, length, molecular weight, number of included amino-acids, presence of antimicrobial properties, solubility, toxicity, or the like.

Any attribute of the causal graph 216 can be used to identify or predict the attribute in another data set, as described below. In the present example, the causal learning module 150 may select $attribute_3$ as the attribute of interest, which may correspond to the presence of antimicrobial properties.

At block 506, the causal learning module 150 generates a classifier 218 of the attribute of interest based on the causal graph 216. As described above, in one embodiment, the classifier 218 is a set of nodes of the causal graph 216 that share a causal relationship with a given node, and can be used to identify or predict the given node in external data sets.

In one embodiment, the causal learning module 150 can generate the classifier 218 by applying a Markov boundary to the attribute of interest. The Markov boundary represents a minimum set of nodes needed to determine a causal relationship between nodes of the causal graph 216 and the node representing the attribute of interest. The Markov boundary of a given node includes the parent nodes, the sub-nodes, and the parent nodes of the sub-nodes of the given node. However, the given node is excluded from the Markov boundary.

In the embodiment illustrated in FIG. 2, the Markov boundary of the attribute of interest ($attribute_3$) includes parent node $attribute_1$, sub-node $attribute_5$, and the parent node ($attribute_2$) of the sub-node ($attribute_5$). However, the node of interest ($attribute_3$) is excluded. Hence, the classifier 218 includes nodes $attribute_1$, $attribute_2$, and $attribute_5$.

At block 508, the causal learning module 150 identifies or predicts the attribute of interest in a second data set based on the classifier 218. In one embodiment, the second data set is different from the training data used to train the generative model 202.

As described above, the nodes of the classifier 218 share a causal relationship with the node of interest. Hence, when the attributes of the second data set partially or fully match with the attributes represented by nodes of the classifier 218, the causal learning module 150 can leverage the causal relationship to predict the attribute of interest in the second data set. In this manner, the causal learning module 150 can map the nodes of the classifier 218 to attributes of the second data set, and then determine whether a value of these attributes in the second data set indicates a value of the attribute of interest in the second data set. Continuing the above example, assuming $attribute_1$ represents a peptide length, $attribute_2$ represents a molecular weight, and $attribute_5$ a toxicity value, the causal learning module 150 can use these nodes of the classifier 218 to determine whether a combination of a peptide length, molecular weight, and toxicity value of a peptide of the second data set would cause the presence of antimicrobial properties (the attribute of interest) in the peptide of the second data set. The method 500 ends at block 510.

While the foregoing is directed to embodiments of the present invention, other and further embodiments of the invention may be devised without departing from the basic scope thereof, and the scope thereof is determined by the claims that follow.

What is claimed is:

1. A method comprising:

determining a first attribute value based on an output of a generative model trained on a first data set;

changing a value of a latent space dimension of the generative model by applying a sampling range to the latent space dimension, the sampling range comprising a range of values that reflect a range of latent variables encoded from an input to the generative model, and generating the second attribute value from resulting attribute values of decoder output of the generative model;

generating a sensitivity map based on a difference between the first attribute value and the second attribute value, wherein the sensitivity map comprises a weight matrix of weights generated based on a linear regression analysis of the difference between the first attribute value and the second attribute value with respect to multiple latent space dimensions of the generative model; and generating a causal graph based on the sensitivity map.

2. The method of claim 1, further comprising:

identifying, based on the causal graph, a node corresponding to an attribute of interest;

generating a classifier of the node corresponding to the attribute of interest; and predicting the attribute of interest in a second data set based on the classifier.

3. The method of claim 1, wherein the range of values reflects the range of latent variables encoded from the input to the generative model.

4. The method of claim 1, wherein the linear regression analysis comprises at least one of a lasso regression, a least squares regression, or a ridge regression.

5. The method of claim 1, wherein the causal graph is a probabilistic graphical model that depicts causal relationships between multiple attributes of the first data set, wherein a node of the causal graph comprises one of the multiple attributes, and wherein an edge of the causal graph represents a causal relationship between two nodes.

6. The method of claim 2, wherein the classifier comprises a set of nodes of the causal graph that share a causal relationship with the node corresponding to the attribute of interest, and wherein the classifier is generated via a Markov boundary applied to the node corresponding to the attribute of interest.

7. The method of claim 2, wherein the attribute of interest is predicted by mapping nodes of the classifier to corresponding attributes in the second data set, and wherein the first data set is different from the second data set.

8. A system, comprising:

a processor; and memory or storage comprising an algorithm or computer instructions, which when executed by the processor, performs an operation comprising:

determining a first attribute value based on an output of a generative model trained on a first data set;

changing a value of a latent space dimension of the generative model by applying a sampling range to the latent space dimension, the sampling range comprising a range of values that reflect a range of latent variables encoded from an input to the generative model, and generating the second attribute value from resulting attribute values of decoder output of the generative model;

generating a sensitivity map based on a difference between the first attribute value and the second attribute value, wherein the sensitivity map comprises a weight matrix of weights generated based on a linear regression analysis of the difference between the first attribute value and the second attribute value with respect to multiple latent space dimensions of the generative model; and generating a causal graph based on the sensitivity map.

9. The system of claim 8, the operation further comprising:

identifying, based on the causal graph, a node corresponding to an attribute of interest;

generating a classifier of the node corresponding to the attribute of interest; and predicting the attribute of interest in a second data set based on the classifier.

10. The system of claim 8, wherein the range of values reflects the range of latent variables encoded from the input to the generative model.

11. The system of claim 8, wherein the linear regression analysis comprises at least one of a lasso regression, a least squares regression, or a ridge regression.

12. The system of claim 8, wherein the causal graph is a probabilistic graphical model that depicts causal relationships between multiple attributes of the first data set, wherein a node of the causal graph comprises one of the multiple attributes, and wherein an edge of the causal graph represents a causal relationship between two nodes.

13. The system of claim 9, wherein the classifier comprises a set of nodes of the causal graph that share a causal relationship with the node corresponding to the attribute of interest, and wherein the classifier is generated via a Markov boundary applied to the node corresponding to the attribute of interest.

14. The system of claim 9, wherein the attribute of interest is predicted by mapping nodes of the classifier to corresponding attributes in the second data set, and wherein the first data set is different from the second data set.

15. A computer-readable storage medium having a computer-readable program code embodied therewith, the computer-readable program code executable by one or more computer processors to perform an operation comprising:

determining a first attribute value based on an output of a generative model trained on a first data set;

changing a value of a latent space dimension of the generative model by applying a sampling range to the latent space dimension, the sampling range comprising a range of values that reflect a range of latent variables encoded from an input to the generative model, and generating the second attribute value from resulting attribute values of decoder output of the generative model;

generating a sensitivity map based on a difference between the first attribute value and the second attribute value, wherein the sensitivity map comprises a weight matrix of weights generated based on a linear regression analysis of the difference between the first attribute value and the second attribute value with respect to multiple latent space dimensions of the generative model; and generating a causal graph based on the sensitivity map.

16. The computer-readable storage medium of claim 15, the operation further comprising:

identifying, based on the causal graph, a node corresponding to an attribute of interest;

generating a classifier of the node corresponding to the attribute of interest; and predicting the attribute of interest in a second data set based on the classifier.

17. The computer-readable storage medium of claim 15, wherein range of values reflects the range of latent variables encoded from the input to the generative model.

18. The computer-readable storage medium of claim 15, wherein the linear regression analysis comprises at least one of a lasso regression, a least squares regression, or a ridge regression.

19. The computer-readable storage medium of claim 15, wherein the causal graph is a probabilistic graphical model that depicts causal relationships between multiple attributes of the first data set, wherein a node of the causal graph comprises one of the multiple attributes, and wherein an edge of the causal graph represents a causal relationship between two nodes.

20. The computer-readable storage medium of claim 16, wherein the classifier comprises a set of nodes of the causal graph that share a causal relationship with the node corresponding to the attribute of interest, and wherein the classifier is generated via a Markov boundary applied to the node corresponding to the attribute of interest.

* * * * *